United States Patent
Chou et al.

(10) Patent No.: US 9,686,556 B2
(45) Date of Patent: Jun. 20, 2017

(54) RATE-ESTIMATION FOR ENCODING RATE CONTROL

(71) Applicant: Apple Inc., Cupertino, CA (US)

(72) Inventors: Jim C. Chou, San Jose, CA (US); Weichun Ku, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/871,797

(22) Filed: Sep. 30, 2015

(65) Prior Publication Data

US 2017/0094284 A1    Mar. 30, 2017

(51) Int. Cl.
H04B 3/46        (2015.01)
H04N 19/147      (2014.01)
H04N 19/503      (2014.01)
H04N 19/593      (2014.01)
H04N 19/513      (2014.01)
H04N 19/567      (2014.01)
H04N 19/583      (2014.01)
H04N 19/635      (2014.01)

(52) U.S. Cl.
CPC ......... *H04N 19/147* (2014.11); *H04N 19/503* (2014.11); *H04N 19/513* (2014.11); *H04N 19/567* (2014.11); *H04N 19/583* (2014.11); *H04N 19/593* (2014.11); *H04N 19/635* (2014.11)

(58) Field of Classification Search
CPC .................................................. H04N 19/194
USPC ....................................................... 375/225
See application file for complete search history.

(56) References Cited

U.S. PATENT DOCUMENTS

| 9,210,435 | B2 * | 12/2015 | Takahashi | H04N 19/176 |
| 2004/0107376 | A1 * | 6/2004 | Mar | H03L 7/087 713/400 |
| 2008/0112483 | A1 * | 5/2008 | Lu | H04N 19/40 375/240.03 |
| 2010/0135396 | A1 * | 6/2010 | Suk | H04N 19/176 375/240.16 |

* cited by examiner

*Primary Examiner* — Lihong Yu
(74) *Attorney, Agent, or Firm* — Fletcher Yoder PC

(57) ABSTRACT

System and method for improving operational efficiency of a video encoding pipeline used to encode image data. In embodiments, the video encoding pipeline includes bit-rate statistics generation that is useful for controlling subsequent bit rates and/or determining encoding operational modes.

17 Claims, 6 Drawing Sheets

RATE-ESTIMATION FOR ENCODING RATE CONTROL

BACKGROUND

The present disclosure generally relates to image data encoding and, more particularly, bit-rate estimation useful to improve rate control in image data encoding.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An electronic device may present visual representations of information as image frames displayed on an electronic display based on image data. Since image data may be received from another electronic device and/or stored in the electronic device, the image data may be encoded (e.g., compressed) to reduce size (e.g., number of bits) and, thus, resources (e.g., transmission bandwidth and/or memory addresses) used to transmit and/or store image data. To display image frames, the electronic device may decode encoded image data and instruct the electronic display to adjust luminance of display pixels based on the decoded image data.

To facilitate encoding, a syntax element binarization process may define a mapping of syntax element values to sequences of binary symbols, or bins. A syntax element binarization (SEB) block may output a bin stream having header and residual syntax elements for each basic processing unit in High Efficiency Video Coding (HEVC), otherwise known as a coding tree unit (CTU).

In some instances, image data may be captured for real-time or near real-time display and/or transmission. For example, when an image sensor (e.g., digital camera) captures image data, an electronic display may shortly thereafter display image frames based on the captured image data. Additionally or alternatively, an electronic device may shortly thereafter transmit the image frames to another electronic device and/or a network. As such, the ability to display and/or transmit in real-time or near real-time may be based at least in part on efficiency with which the image data is encoded. To achieve real-time or near real-time encoding, a SEB block implemented on a main pipeline may operate according to strict timing constraints. For efficiency, a transcode block that encodes the syntax elements of the bin stream outputted from the SEB block may be implemented in a parallel pipeline. However, even when the transcoding block is maintaining average throughput requirements, the transcode block processing may be multiple CTUs behind the SEB block. Accordingly, as will be discussed in more detail below, it may be beneficial to utilize techniques for enhanced decision-making for more effective rate control.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to encoding source image data, which may enable reducing transmission bandwidth and/or memory usage. To facilitate, a video encoding pipeline may determine encoding operational parameters and implement the encoding operational parameters to encode the source image data. In some embodiments, the source image data may be encoded using rate control techniques that utilize bit-rate estimation statistics. For example, the rate control techniques described herein may modify processing decisions within certain pipeline blocks based at least in part upon collected bit-rate statistics (e.g., counts and/or probabilities of encoding a "0" and/or a "1"). The techniques provided herein may facilitate more accurate rate controls for various encoding blocks of the image video encoding pipelines.

To implement these enhanced rate control techniques, a hardware block within the video encoding pipelines (e.g., the SEB block) may collect statistics used to estimate a probability for 0s and 1s associated with certain syntax elements' contexts. For example, counts of previously encoded 0s and 1s may be accumulated in one or more hardware blocks. These counts may be used to determine a probability of subsequent encoding of 0s and 1s, according to the syntax element context. The probabilities may be used to determine a subsequent bit-rate estimate. This bit-rate estimate may be provided to one or more hardware blocks within the video encoding pipelines, such that a bit-rate of one or more hardware blocks may be controlled based upon the bit-rate estimation Accordingly, the present disclosure provides techniques to improve operational efficiency of the video encoding pipeline. In some embodiments, operational efficiency may be improved by controlling a bit-rate of certain features in the video encoding pipeline based upon a bit-rate estimation calculated from one or more collected bit-rate statistics.

BRIEF DESCRIPTION OF THE DRAWINGS

Various aspects of this disclosure may be better understood upon reading the following detailed description and upon reference to the drawings in which.

DETAILED DESCRIPTION

Figure 1:
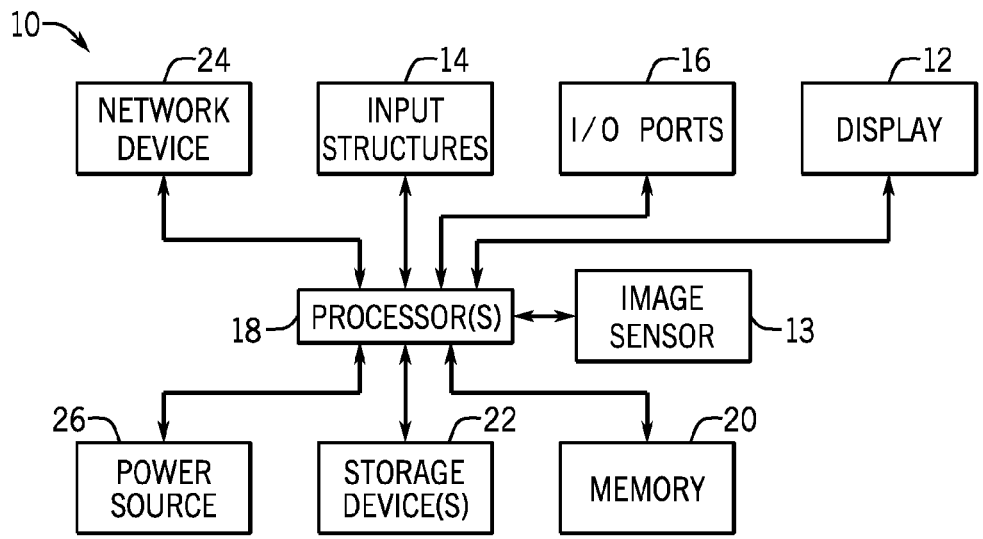
FIG. 1 is a block diagram of an electronic device, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, an electronic device may facilitate visually presenting information by instructing an electronic display to display image frames based on image data. In some embodiments, the image data may be generated by an image sensor (e.g., digital camera) and stored in the electronic device. Additionally, when the image data is generated external from the electronic display, the image data may be transmitted to the electronic device. To reduce resource usage, image data may be encoded (e.g., compressed) to reduce size (e.g., number of bits) which, for example, may reduce transmission bandwidth and/or memory address usage.

In some embodiments, a video encoding pipeline may determine encoding operational parameters and implement the encoding operational parameters to encode source image data. To facilitate encoding, source image data for an image frame may be divided into one or more coding units. As used herein, a "coding unit" (CU) is intended to describe a sample of source image data (e.g., pixel image data) corresponding to a group of display pixels, which is encoded using the same prediction technique. Further, as used herein, a "coding tree unit" refers to a group of CUs that make up the largest coding unit size for High Efficiency Video Coding (HEVC).

Accordingly, the video encoding pipeline may determine bit-rate statistics for each CTU. These statistics may be used to calculate subsequent bit-rate estimations, which may be used to facilitate rate control and/or mode decisions in the video encoding pipeline. For example, a mode decision block may decide between various operational modes based at least in part upon the bit-rate estimation. Further, a bit-rate of certain video encoding pipeline features may be controlled based upon these bit-rate estimations.

To help illustrate, a computing (e.g., electronic) device 10 that may utilize an electronic display 12 to display image frames based on image data and/or an image sensor 13 to capture image data is described in FIG. 1. As will be described in more detail below, the computing device 10 may be any suitable computing device, such as a handheld computing device, a tablet computing device, a notebook computer, and the like. Thus, it should be noted that FIG. 1 is merely one example of a particular implementation and is intended to illustrate the types of components that may be present in the computing device 10.

In the depicted embodiment, the computing device 10 includes the electronic display 12, the image sensor 13, input structures 14, input/output (I/O) ports 16, one or more processor core complex 18, having one or more processor(s) or processor cores, local memory 20, a main memory storage device 22, a network interface 24, and a power source 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

As depicted, the processor complex 18 is operably coupled with local memory 20 and the main memory storage device 22. Thus, the processor complex 18 may execute instruction stored in local memory 20 and/or the main memory storage device 22 to perform operations, such as encoding image data captured by the image sensor 13 and/or decoding image data for display on the electronic display 12. As such, the processor complex 18 may include one or more general purpose microprocessors, one or more application specific processors (ASICs), one or more field programmable logic arrays (FPGAs), or any combination thereof.

The local memory 20 and/or the main memory storage device 22 may be tangible, non-transitory, computer-readable mediums that store instructions executable by and data to be processed by the processor complex 18. For example, the local memory 20 may include random access memory (RAM) and the main memory storage device 22 may include read only memory (ROM), rewritable flash memory, hard drives, optical discs, and the like. By way of example, a computer program product containing the instructions may include an operating system or an application program.

Additionally, as depicted, the processor complex 18 is operably coupled with the network interface 24. Using the network interface 24, the computing device 10 may communicatively couple to a network and/or other computing devices. For example, the network interface 24 may connect the computing device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the computing device 10 to transmit encoded image data to a network and/or receive encoded image data from the network for display on the electronic display 12.

Furthermore, as depicted, the processor complex 18 is operably coupled with I/O ports 16, which may enable the computing device 10 to interface with various other electronic devices. For example, a portable storage device may be connected to an I/O port 16, thereby enabling the processor complex 18 to communicate data with a portable storage device. In this manner, the I/O ports 16 may enable the computing device 10 to output encoded image data to the portable storage device and/or receive encoding image data from the portable storage device.

As depicted, the processor complex 18 is also operably coupled to the power source 26, which may provide power to the various components in the computing device 10. The power source 26 may include any suitable source of energy, such as a rechargeable lithium polymer (Li-poly) battery and/or an alternating current (AC) power converter. Furthermore, as depicted, the processor complex 18 is operably coupled with input structures 14, which may enable a user to interact with the computing device 10. The inputs structures 14 may include buttons, keyboards, mice, trackpads, and the like. Additionally or alternatively, the electronic display 12 may include touch components that enable user inputs to the computing device 10 by detecting occurrence and/or position of an object touching its screen (e.g., surface of the electronic display 12).

In addition to enabling user inputs, the electronic display 12 may present visual representations of information by display image frames, such as a graphical user interface (GUI) of an operating system, an application interface, a still image, or video content. As described above, the electronic display 12 may display the image frames based on image data. In some embodiments, the image data may be received from other computing devices 10, for example, via the network interface 24 and/or the I/O ports 16. Additionally or alternatively, the image data may be generated by computing device 10 using the image sensor 13. In some embodiments, image sensor 13 may digitally capture visual representations of proximate physical features as image data.

As described above, the image data may be encoded (e.g., compressed), for example by the computing device 10 that generated the image data, to reduce number of memory addresses used to store and/or bandwidth used to transmit the image data. Once generated or received, the encoded image data may be stored in local memory 20. Accordingly, to display image frames, the processor complex 18 may retrieve encoded image data from local memory 20, decode the encoded image data, and instruct the electronic display 12 to display image frames based on the decoded image data.

Figure 2:
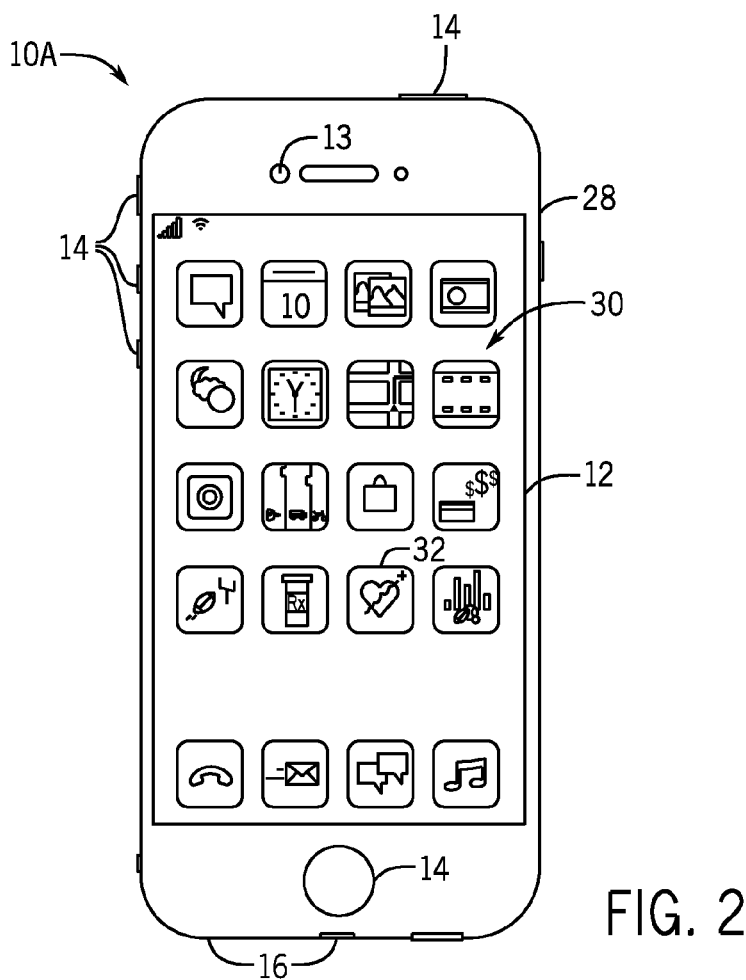
FIG. 2 is an example of the electronic device of FIG. 1, in accordance with an embodiment.

As described above, the computing device 10 may be any suitable electronic device. To help illustrate, one example of a handheld device 10A is described in FIG. 2, which may be a portable phone, a media player, a personal data organizer, a handheld game platform, or any combination of such devices. For example, the handheld device 10A may be a smart phone, such as any iPhone® model available from Apple Inc. As depicted, the handheld device 10A includes an enclosure 28, which may protect interior components from physical damage and/or shields them from electromagnetic interference. The enclosure 28 may surround the electronic display 12, which, in the depicted embodiment, displays a graphical user interface (GUI) 30 having an array of icons 32. By way of example, when an icon 32 is selected either by an input structure 14 or a touch component of the electronic display 12, an application program may launch.

Additionally, as depicted, input structures 14 open through the enclosure 28. As described above, the input structures 14 may enable user interaction with the handheld device 10A. For example, the input structures 14 may activate or deactivate the handheld device 10A, navigate a user interface to a home screen, navigate a user interface to a user-configurable application screen, activate a voice-recognition feature, provide volume control, and/or toggle between vibrate and ring modes. As depicted, I/O ports 16 also open through the enclosure 28. In some embodiments, the I/O ports 16 may include an audio jack to connect to external devices. Furthermore, as depicted, the image sensor 13 opens through the enclosure 28. In some embodiments, the image sensor 13 may include a digital camera that captures image data.

Figure 3:
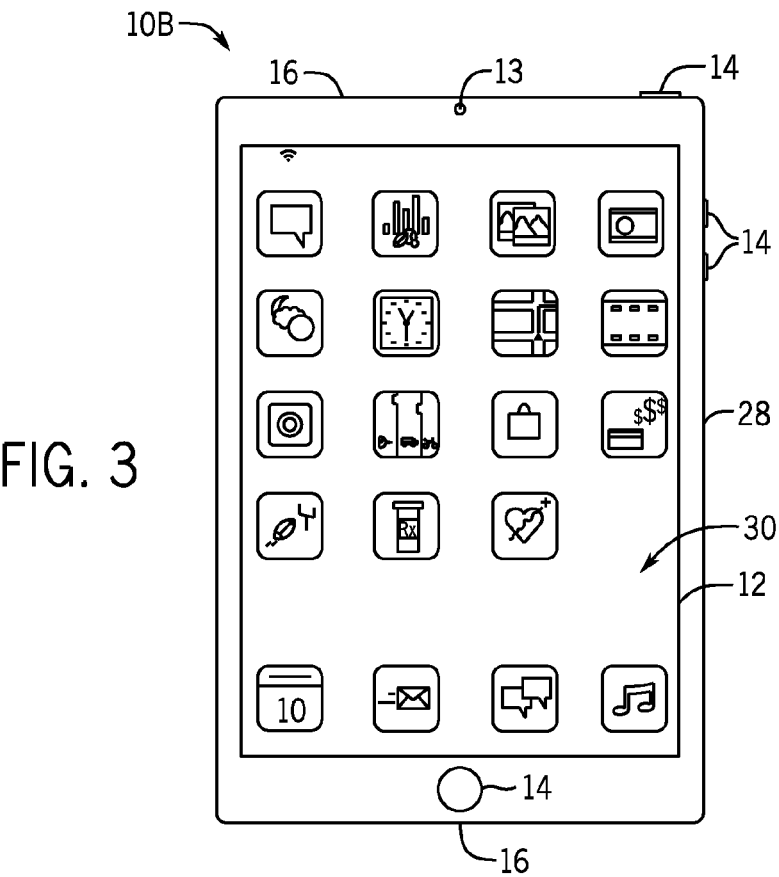
FIG. 3 is an example of the electronic device of FIG. 1, in accordance with an embodiment.
Figure 4:
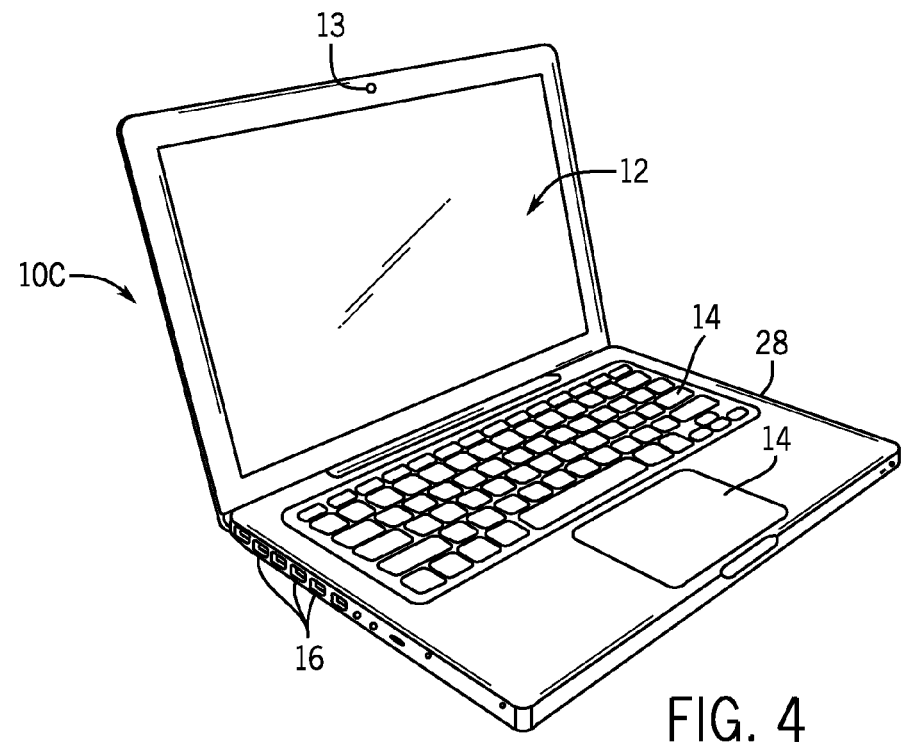
FIG. 4 is an example of the electronic device of FIG. 1, in accordance with an embodiment.
Figure 5:
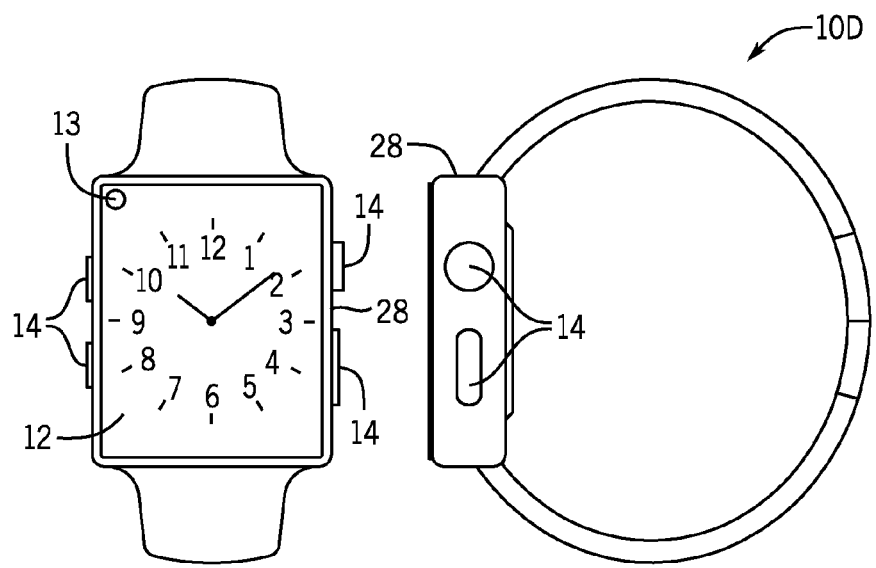
FIG. 5 is an example of the electronic device of FIG. 1, in accordance with an embodiment.

To further illustrate a suitable computing device 10, a tablet device 10B is described in FIG. 3. For example, the tablet device 10B may be any iPad® model available from Apple Inc. Additionally, in other embodiments, the computing device 10 may take the form of a computer 10C as described in FIG. 4. For example, the computer 10C may be any Macbook® or iMac® model available from Apple Inc. Furthermore, in other embodiments, the computing device 10 may take the form of a watch 10D as described in FIG. 5. For example, the watch 10D may be any Apple Watch® model available from Apple Inc. As depicted, the tablet device 10B, the computer 10C, and the watch 10D may each also include an electronic display 12, an image sensor 13, input structures 14, I/O ports 16, an enclosure 28, or any combination thereof.

As described above, source image data may be encoded (e.g., compressed) to reduce resource usage. Additionally, in some embodiments, the duration between generation of image data and display of image frames based on the image data may be limited to enable real-time or near real-time display and/or transmission of generated image frames. For example, image data captured by the image sensor 13 may be displayed on the electronic display 12 with minimal delay to enable a user to determine physical features proximate the image sensor 13 in real-time or near real-time. Additionally, image data generated by the computing device 10 (e.g., by the image sensor 13) may be transmitted (e.g., broadcast) to one or more other computing devices 10 to enable a real-time or near real-time streaming. To enable real-time or near real-time transmission and/or display, duration available to encode image data may be limited, particularly as resolution of image frames and/or refresh rates of electronic displays 12 increase.

Figure 6:
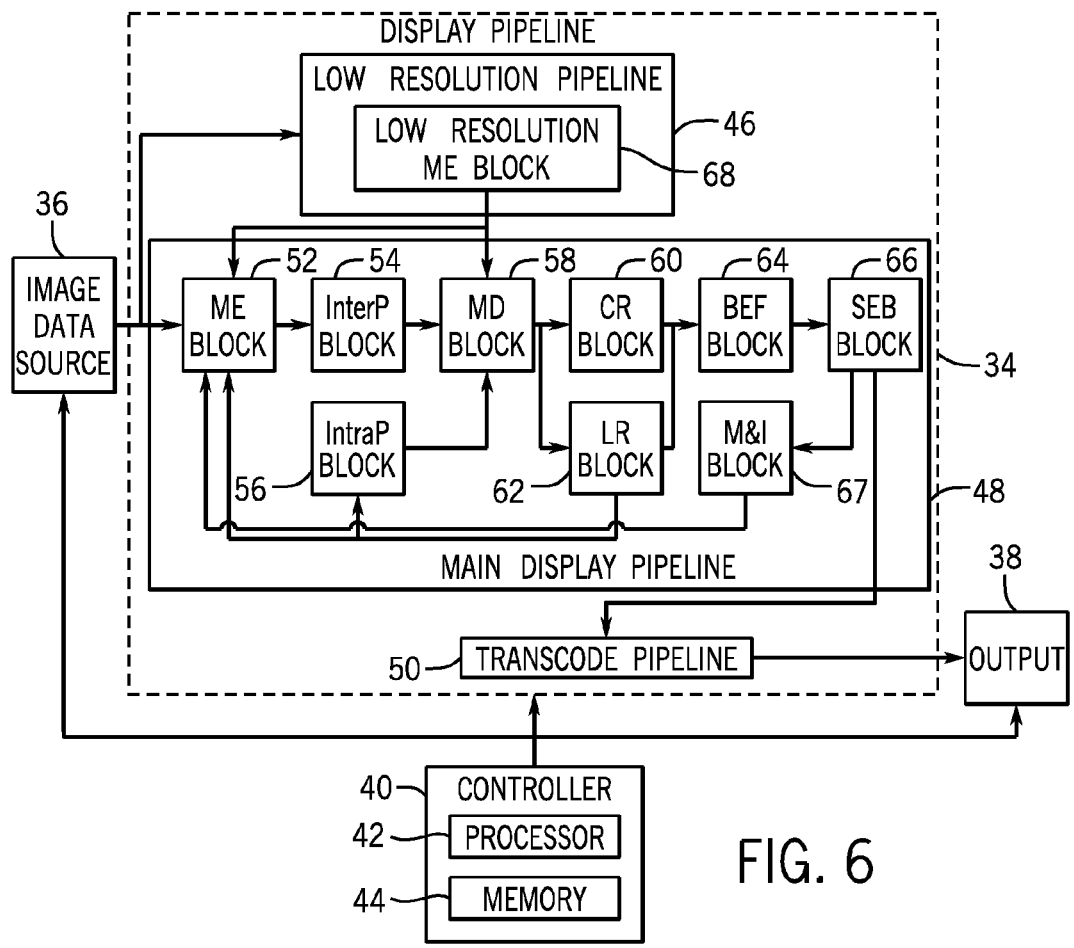
FIG. 6 is block diagram of a video encoding pipeline used to encode image data, in accordance with an embodiment.

One embodiment of a video encoding pipeline 34 that may be used to encode image data is described in FIG. 6. As depicted, the video encoding pipeline 34 is communicatively coupled to an image data source 36, an output 38, and a controller 40. In the depicted embodiment, the controller 40 may generally control operation of image data source 36, the video encoding pipeline 34, and the output 38. Although depicted as a single controller 40, in other embodiments, one or more separate controllers 40 may be used to control operation of the image data source 36, the video encoding pipeline 34, the output 38, or any combination thereof.

To facilitate controlling operation, the controller 40 may include a controller processor 42 and controller memory 44. In some embodiments, the controller processor 42 may execute instructions and/or process data stored in the controller memory 44 to control operation of the image data source 36, the video encoding pipeline 34, and/or the output 38. In other embodiments, the controller processor 42 may be hardwired with instructions that control operation in the image data source 36, the video encoding pipeline 34, and/or the output 38 when executed. Additionally, in some embodiments, the controller processor 42 may be included in the processor complex 18 and/or separate processing circuitry (e.g., in the electronic display) and the controller memory 44 may be included in local memory 20, main memory storage device 22 and/or a separate, tangible, non-transitory computer-readable medium (e.g., in the electronic display).

As depicted, the video encoding pipeline 34 is communicatively coupled to the image data source 36. In this manner, the video encoding pipeline 34 may receive image data from the image data source 36. Thus, in some embodiments, the image data source 36 may be the image sensor 13 and/or any other suitable device that generates and/or provides source image data.

Additionally, as depicted, the video encoding pipeline 34 is communicatively coupled to the output 38. In this manner, the video encoding pipeline 34 may output encoded (e.g., compressed) image data to the output 38, for example, for storage and/or transmission. Thus, in some embodiments, the output 38 may include the local memory 20, the main memory storage device 22, the network interface 24, the I/O ports 16, the controller memory 44, or any combination thereof.

To facilitate generating encoded image data, the video encoding pipeline 34 may include multiple parallel pipelines. For example, in the depicted embodiment, the video encoding pipeline 34 includes a low resolution pipeline 46, a main pipeline 48, and a transcode pipeline 50. As will be described in more detail below, the main pipeline 48 may encode source image data using prediction techniques (e.g., inter-frame prediction techniques or intra-frame prediction intra-frame prediction techniques) and the transcode pipeline 50 may subsequently entropy encode syntax elements that indicate encoding operational parameters (e.g., quantization coefficient, inter-frame prediction mode, and/or intra-frame prediction mode) used to prediction encode the image data.

To facilitate prediction encoding source image data, the main pipeline 48 may perform various functions. To simplify discussion, the functions are divided between various blocks in the main pipeline 48. In the depicted embodiment, the main pipeline 48 includes a motion estimation (ME) block 52, an inter-frame prediction (InterP) block 54, an intra-frame prediction (IntraP) block 56, a mode decision (MD) block 58, a chroma reconstruction (CR) block 60, a luma reconstruction (LR) block 62, a back-end-filter (BEF) block 64, and a syntax element binarization (SEB) block 66. A Macroblock input (MBI) block 67 may also be included.

As depicted, the motion estimation block 52 is communicatively coupled to the image data source 36. In this manner, the motion estimation block 52 may receive source image data from the image data source 36, which may include a luma component (e.g., Y) and two chroma components (e.g., Cr and Cb). In some embodiments, the motion estimation block 52 may process one coding unit, including one luma coding block and two chroma coding blocks, at a time. As used herein a "luma coding block" is intended to describe the luma component of a coding unit and a "chroma coding block" is intended to describe a chroma component of a coding unit. In some embodiments, the luma coding block may be the same resolution as the coding unit. On the other hand, the chroma coding blocks may vary in resolution based on chroma sampling format. For example, using a 4:4:4 sampling format, the chroma coding blocks may be the same resolution as the coding unit. However, the chroma coding blocks may be half the resolution of the coding unit when a 4:2:2 sampling format is used and a quarter the resolution of the coding unit when a 4:2:0 sampling format is used.

As described above, a coding unit may include one or more prediction units, which may each be encoded using the same prediction technique, but different prediction modes. Each prediction unit may include one luma prediction block and two chroma prediction blocks. As used herein a "luma prediction block" is intended to describe the luma component of a prediction unit and a "chroma prediction block" is intended to describe a chroma component of a prediction unit. In some embodiments, the luma prediction block may be the same resolution as the prediction unit. On the other hand, similar to the chroma coding blocks, the chroma prediction blocks may vary in resolution based on chroma sampling format.

Based at least in part on the one or more luma prediction blocks, the motion estimation block 52 may determine candidate inter-frame prediction modes that can be used to encode a prediction unit. An inter-frame prediction mode may include a motion vector and a reference index to indicate location (e.g., spatial position and temporal position) of a reference sample relative to a prediction unit. More specifically, the reference index may indicate display order of a reference image frame corresponding with the reference sample relative to a current image frame corresponding with the prediction unit. Additionally, the motion vector may indicate position of the reference sample in the reference image frame relative to position of the prediction unit in the current image frame.

To determine a candidate inter-frame prediction mode, the motion estimation block 52 may search reconstructed luma image data, which may be received from the luma reconstruction block 62. For example, the motion estimation block 52 may determine a reference sample for a prediction unit by comparing its luma prediction block to the luma of reconstructed image data. In some embodiments, the motion estimation block 52 may determine how closely a prediction unit and a reference sample match based on a match metric. In some embodiments, the match metric may be the sum of absolute difference (SAD) between a luma prediction block of the prediction unit and luma of the reference sample. Additionally or alternatively, the match metric may be the sum of absolute transformed difference (SATD) between the luma prediction block and luma of the reference sample. When the match metric is above a match threshold, the motion estimation block 52 may determine that the reference sample and the prediction unit do not closely match. On the other hand, when the match metric is below the match threshold, the motion estimation block 52 may determine that the reference sample and the prediction unit are similar.

After a reference sample that sufficiently matches the prediction unit is determined, the motion estimation block 52 may determine location of the reference sample relative to the prediction unit. For example, the motion estimation block 52 may determine a reference index to indicate a reference image frame, which contains the reference sample, relative to a current image frame, which contains the prediction unit. Additionally, the motion estimation block 52 may determine a motion vector to indicate position of the reference sample in the reference frame relative to position of the prediction unit in the current frame. In some embodiments, the motion vector may be expressed as (mvX, mvY), where mvX is horizontal offset and mvY is a vertical offset between the prediction unit and the reference sample.

In this manner, the motion estimation block 52 may determine candidate inter-frame prediction modes (e.g., reference index and motion vector) for one or more prediction units in the coding unit. The motion estimation block 52 may then input candidate inter-frame prediction modes to the inter-frame prediction block 54. Based at least in part on the candidate inter-frame prediction modes, the inter-frame prediction block 54 may determine luma prediction samples.

In some embodiments, the inter-frame prediction block 54 may determine a luma prediction sample by applying motion compensation to a reference sample indicated by a candidate inter-frame prediction mode. For example, the inter-frame prediction block 54 may apply motion compensation by determining luma of the reference sample at fractional (e.g., quarter or half) pixel positions. The inter-frame prediction block 54 may then input the luma prediction sample and corresponding candidate inter-frame prediction mode to the mode decision block 58 for consideration. In some embodiments, the inter-frame prediction block 54 may sort the candidate inter-frame prediction modes based on associated mode cost and input only a specific number to the mode decision block 58.

The mode decision block 58 may also consider one or more candidate intra-frame predictions modes and corresponding luma prediction samples output by the intra-frame prediction block 56. The main pipeline 48 may be capable of using multiple (e.g., 9 or 35) different intra-frame prediction modes to generate luma prediction samples based on adjacent pixel image data. Thus, in some embodiments, the intra-frame prediction block 56 may determine a candidate intra-frame prediction mode and corresponding luma prediction sample for a prediction unit based at least in part on luma of reconstructed image data for adjacent (e.g., top, top right, left, or bottom left) pixels, which may be received from the luma reconstruction block 62.

For example, utilizing a vertical prediction mode, the intra-frame prediction block 56 may set each column of a luma prediction sample equal to reconstructed luma of a pixel directly above the column. Additionally, utilizing a DC prediction mode, the intra-frame prediction block 45 may set a luma prediction sample equal to an average of reconstructed luma of pixels adjacent the prediction sample. The intra-frame prediction block 56 may then input candidate intra-frame prediction modes and corresponding luma prediction samples to the mode decision block 58 for consideration. In some embodiments, the intra-frame prediction block 56 may sort the candidate intra-frame prediction modes based on associated mode cost and input only a specific number to the mode decision block 58.

The mode decision block 58 may determine encoding operational parameters used to encode the source image data (e.g., coding block). In some embodiments, the encoding operational parameters for a coding block may include prediction technique (e.g., intra-prediction techniques or inter-frame prediction techniques) for the coding block, number of prediction units in the coding block, size of the prediction units, prediction mode (e.g., intra-prediction modes or inter-frame prediction modes) for each of the prediction unit, number of transform units in the coding block, size of the transform units, whether to split the coding unit into smaller coding units, or any combination thereof.

To facilitate determining the encoding operational parameters, the mode decision block 58 may determine whether the image frame is an I-frame, a P-frame, or a B-frame. In I-frames, source image data is encoded only by referencing other image data used to display the same image frame. Accordingly, when the image frame is an I-frame, the mode decision block 58 may determine that each coding unit in the image frame may be prediction encoded using intra-frame prediction techniques.

On the other hand, in a P-frame or B-frame, source image data may be encoded by referencing image data used to display the same image frame and/or a different image frames. More specifically, in a P-frame, source image data may be encoding by referencing image data used to display a previous image frame. Additionally, in a B-frame, source image data may be encoded by referencing both image data used to display a previous image frame and image data used to display a subsequently image frame. Accordingly, when the image frame is a P-frame or a B-frame, the mode decision block 58 may determine each coding unit in the image frame may be prediction encoded using either intra-frame techniques or inter-frame techniques.

Although using the same prediction technique, the configuration of luma prediction blocks in a coding unit may vary. For example, the coding unit may include a variable number of luma prediction blocks at variable locations within the coding unit, which each uses a different prediction mode. As used herein, a "prediction mode configuration" is intended to describe number, size, location, and prediction mode of luma prediction blocks in a coding unit. Thus, the mode decision block 58 may determine a candidate inter-frame prediction mode configuration using one or more of the candidate inter-frame prediction modes received from the inter-frame prediction block 54. Additionally, the mode decision block 58 may determine a candidate intra-frame prediction mode configuration using one or more of the candidate intra-frame prediction modes received from the intra-frame prediction block 56.

Since a coding block may utilize the same prediction technique, the mode decision block 58 may determine prediction technique for a coding unit by comparing rate-distortion cost associated with the candidate prediction mode configurations and/or a skip mode. In some embodiments, the rate-distortion cost may be as follows:

$$RD = A(\text{rate\_Cost}) + B(\text{distortion}) \quad (1)$$

where RD is the rate-distortion cost, rate is estimated rate expected to be used to indicate the source image data, distortion is a distortion metric (e.g., sum of squared difference), A is a weighting factor for the estimated rate, and B is a weighting factor for the distortion metric.

The distortion metric may indicate amount of distortion in decoded image data expected to be caused by implementing a prediction mode configuration. Accordingly, in some embodiments, the distortion metric may be a sum of squared difference (SSD) between a luma coding block (e.g., source image data) and reconstructed luma image data received from the luma reconstruction block 62. As will be described in more detail below, reconstructed image data may be generated by subtracting a prediction sample from source image data to determine a prediction residual, performing a forward transform and quantization (FTQ) on the prediction residual, performing an inverse transform and quantization (ITQ) to determine a reconstructed prediction residual, and adding the reconstructed prediction residual to the prediction sample.

In some embodiments, the prediction residual of a coding unit may be transformed as one or more transform units. As used herein, a "transform unit" is intended to describe a sample within a coding unit that is transformed together. In some embodiments, a coding unit may include a single transform unit. In other embodiments, the coding unit may be divided into multiple transform units, which is each separately transformed.

Additionally, the estimated rate for an intra-frame prediction mode configuration may include expected number of bits used to indicate intra-frame prediction technique (e.g., coding unit overhead), expected number of bits used to indicate intra-frame prediction mode, expected number of bits used to indicate a prediction residual (e.g., source image data—prediction sample), and expected number of bits used to indicate a transform unit split. On the other hand, the estimated rate for an inter-frame prediction mode configuration may include expected number of bits used to indicate inter-frame prediction technique, expected number of bits used to indicate a motion vector (e.g., motion vector difference), and expected number of bits used to indicate a transform unit split. Additionally, the estimated rate of the skip mode may include number of bits expected to be used to indicate the coding unit when prediction encoding is skipped.

In embodiments where the rate-distortion cost of equation (1) is used, the mode decision block 58 may select prediction mode configuration or skip mode with the lowest associated rate-distortion cost for a coding unit. In this manner, the mode decision block 58 may determine encoding operational parameters for a coding block, which may include prediction technique (e.g., intra-prediction techniques or inter-frame prediction techniques) for the coding block, number of prediction units in the coding block, size of the prediction units, prediction mode (e.g., intra-prediction modes or inter-frame prediction modes) for each of the prediction unit, number of transform units in the coding block, size of the transform units, whether to split the coding unit into smaller coding units, or any combination thereof.

To improve quality of decoded image data, the main pipeline 48 may then mirror decoding of encoded image data. To facilitate, the mode decision block 58 may output the encoding operational parameters and/or luma prediction samples to the chroma reconstruction block 60 and the luma reconstruction block 62. Based on the encoding operational parameters, the luma reconstruction block 62 and the chroma reconstruction block 60 may determine reconstruct image data.

More specifically, the luma reconstruction block 62 may generate the luma component of reconstruct image data. In some embodiments, the luma reconstruction block 62 may generate reconstructed luma image data by subtracting the luma prediction sample from luma of the source image data to determine a luma prediction residual. The luma reconstruction block 62 may then divide the luma prediction residuals into luma transform blocks as determined by the mode decision block 58, perform a forward transform and quantization on each of the luma transform blocks, and perform an inverse transform and quantization on each of the luma transform blocks to determine a reconstructed luma prediction residual. The luma reconstruction block 62 then add the reconstructed luma prediction residual to the luma prediction sample to determine reconstructed luma image data. As described above, the reconstructed luma image data may then be fed back for use in other blocks in the main pipeline 48. Additionally, the reconstructed luma image data may be output to the back-end-filter block 64.

On the other hand, the chroma reconstruction block 60 may generate both chroma components of reconstructed image data. In some embodiments, chroma reconstruction may be dependent on sampling format. For example, when luma and chroma are sampled at the same resolution (e.g., 4:4:4 sampling format), the chroma reconstruction block 60 may utilize the same encoding operational parameters as the luma reconstruction block 62. In such embodiments, for each chroma component, the chroma reconstruction block 60 may generate a chroma prediction sample by applying the prediction mode configuration determined by the mode decision block 58 to adjacent pixel image data.

The chroma reconstruction block 60 may then subtract the chroma prediction sample from chroma of the source image data to determine a chroma prediction residual. Additionally, the chroma reconstruction block 60 may divide the chroma prediction residual into chroma transform blocks as determined by the mode decision block 58, perform a forward transform and quantization on each of the chroma transform blocks, and perform an inverse transform and quantization on each of the chroma transform blocks to determine a reconstructed chroma prediction residual. The chroma reconstruction block may then add the reconstructed chroma prediction residual to the chroma prediction sample to determine reconstructed chroma image data, what may be input to the back-end-filter block 64.

However, in other embodiments, chroma sampling resolution may vary from luma sampling resolution, for example when a 4:2:2 or 4:2:0 sampling format is used. In such embodiments, encoding operational parameters determined by the mode decision block 58 may be scaled. For example, when the 4:2:2 sampling format is used, size of chroma prediction blocks may be scaled in half horizontally from the size of prediction units determined in the mode decision block 58. Additionally, when the 4:2:0 sampling format is used, size of chroma prediction blocks may be scaled in half vertically and horizontally from the size of prediction units determined in the mode decision block 58. In a similar manner, a motion vector determined by the mode decision block 58 may be scaled for use with chroma prediction blocks.

To improve quality of decode image data, the back-end-filter block 64 may then filter the reconstructed image data (e.g., reconstructed chroma image data and/or reconstructed luma image data). In some embodiments, the back-end-filter block 64 may perform deblocking and/or sample adaptive offset (SAO) functions. For example, the back-end-filter block 64 may perform deblocking on the reconstructed image data to reduce perceivability of blocking artifacts that may be introduced. Additionally, the back-end-filter block 64 may perform a sample adapt offset function by adding offsets to portions of the reconstructed image data.

To enable decoding, encoding operational parameters used to generate encoded image data may be communicated to a decoding device. In some embodiments, the encoding operational parameters may include the encoding operational parameters determined by the mode decision block 58 (e.g., prediction unit configuration and/or transform unit configuration), encoding operational parameters used by the luma reconstruction block 62 and the chroma reconstruction block (e.g., quantization coefficients), and encoding operational parameters used by the back-end-filter block 64. To facilitate communication, the encoding operational parameters may be expressed as syntax elements. For example, a first syntax element may indicate a prediction mode (e.g., inter-frame prediction mode or intra-frame prediction mode), a second syntax element may indicate a quantization coefficient, a third syntax element may indicate configuration of prediction units, and a fourth syntax element may indicate configuration of transform units.

In some embodiments, resources used to communicate the encoding operational parameters may be reduced using entropy encoding, such as context adaptive binary arithmetic coding (CABAC) and/or context-adaptive variable-length coding (CAVLC). To facilitate, the syntax element binarization (SEB) block 66 may receive encoding operational parameters expressed as syntax elements from the mode decision block 58, the luma reconstruction block 62, the chroma reconstruction block 60, and/or the back-end-filter block 64. The syntax element binarization block 66 may then binarize a syntax element by mapping the syntax element to a corresponding binary symbol, which includes one or more bins (e.g., "0" or "1"). In some embodiments, the syntax element binarization block 66 may generate the binary symbol using exp-golomb, fixed length, truncated unary, truncated rice, or any combination thereof. In this manner, the syntax element binarization block 66 may generate a bin stream, which is supplied to the transcode pipeline 50.

Generation of Bit-Rate Statistics

Figure 7:
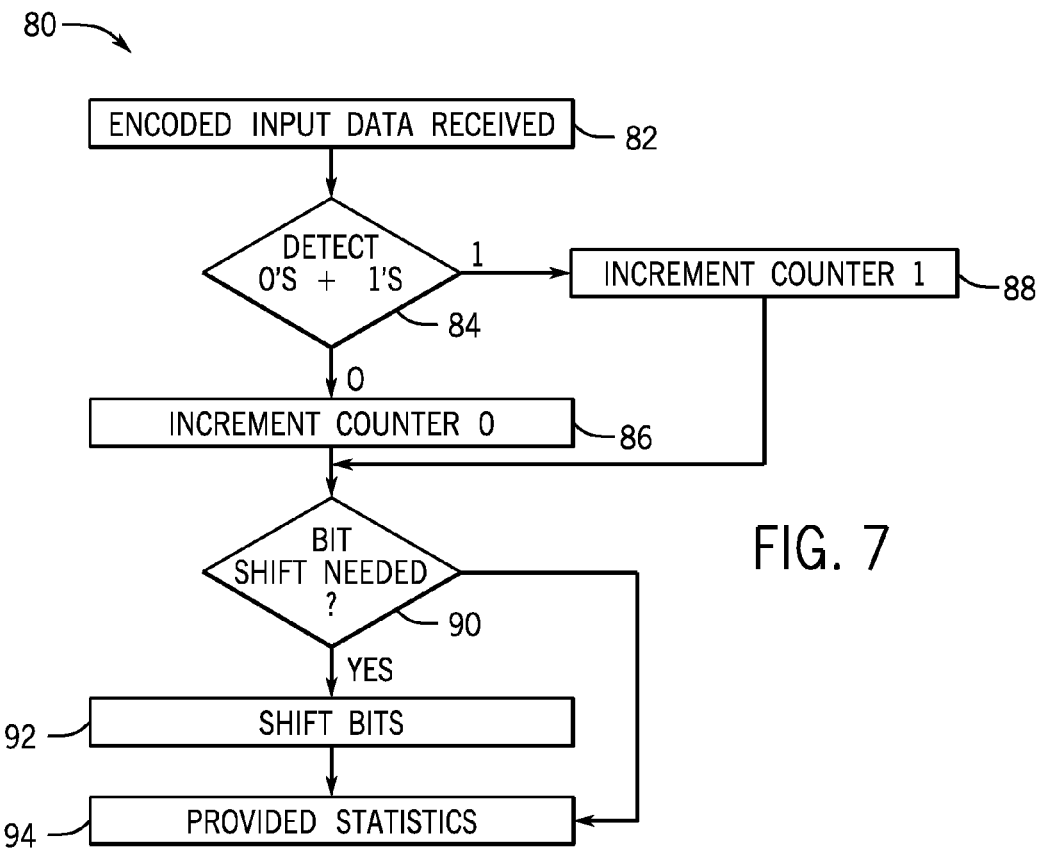
FIG. 7 illustrates a hardware-implemented process for generating bit-rate statistics, in accordance with an embodiment.

As discussed above, the SEB block 66 may generate bit-rate statistics that may be used for subsequent rate control in the video encoding pipeline 34. The bit-rate statistics may count the numbers of 0s and 1s that have been encoded. FIG. 7 illustrates a hardware-implemented process 80 for generating bit-rate statistics.

To accumulate these counts (e.g., the bit-rate statistics), the encoded input data is received (block 82). For example, the encoded input data may be received at the SEB block 66 of FIG. 6. The hardware may detect encoded 0s and 1s (at decision block 84). A zero counter may increment each time a 0 is encoded for a particular syntax element context (block 86) and a one counter may increment each time a 1 is encoded for the same particular syntax element context (block 88).

Both of the counters may be normalized at the end of processing each CTU. In some embodiments, the statistics from the first and second counters may be stored in two respective registers (e.g., 16-bit registers). In some instances the counts of 0s and/or 1s may overflow the registers. Accordingly, an extra overflow bit may be maintained to handle this situation. May different normalization techniques may be used. In some embodiments, at the end of processing each CTU, if either count is equal to 0xffff or the overflow bit is set for either count, a determination may be made that a bit shift is needed (decision block 90). In such a case, in some embodiments, both counts may be shifted to the right by 1 with the overflow bit appended in the most significant bit (MSB) (block 92).

The bit-rate statistics (e.g., the counts) may be provided for subsequent processing and/or use in the video encoding pipeline 34 (block 94). For example, the bit-rate statistics may be provided to a macroblock input (MBI) block 67 of FIG. 6.

In some embodiments, statistics are not collected for every context for every syntax element. For example, some context may have no collected statistics. For other contexts, a single set of counts are maintained across all of the contexts for the given syntax element.

For syntax elements where there is a single context associated with each syntax element, the following logic is applied:
  if (bin==0) count0[statStartIdx]++;
  if (bin==1) count1[statStartIdx]++;

In the above logic, bin represents the single bin that is associated with the regular bin context of the syntax element and statStartIdx represents the starting index of the corresponding bin statistics. In other words, when the regular bin context is 0, the zero counter at the starting index of the corresponding bin statistics is incremented. When the regular bin context is 1, the one counter at the starting index of the corresponding bin statistics is incremented.

For some syntax elements, statistics that correspond to all of the contexts are collapsed into a single set of statistics.
  if ((ctxIdx>=startIdx) && (ctxIdx<=endIdx))
  {
    if (bin==0) count0[statStartIdx]++;
    else if (bin==1) count1[statStartIdx]++;
  }

As used herein, startIdx and endIdx correspond to the starting and ending indices of the corresponding context, respectively. CtxIdx relates to the indices of the corresponding context and statStartIdx represents the starting index of the corresponding bin statistic. As may be appreciated by the above pseudo-code, the counts for these syntax elements relate to the total set of context for the particular syntax element.

For some syntax elements, particular contexts are collapsed into a single set of statistics. For example, in the below pseudo-code, the second and third contexts are collapsed into a single set of statistics.
  if (ctxIdx=startIdx)
  {
    if (bin==0) count0[statStartIdx]++;
    else if (bin==1) count1[statStartIdx]++;
  }
  else if (ctxIdx==(startIdx+1))
  {
    if (bin==0) count0[statStartIdx+1]++;
    else if (bin==1) count1[statStartIdx+1]++;
  }
  else if ((ctxIdx>=(startIdx+2)) && (ctxIdx<=(startIdx+3)))
  {
    if (bin==0) count0[statStartIdx+2]++;
    else if (bin==1) count1[statStartIdx+2]++;
  }

As may be appreciated, separate statistics are generated for contexts 0 and 1, while contexts 2 and 3 share a single set of statistics.

For some syntax elements, statistics are gathered on a one-to-one basis with relation to the different contexts of the syntax elements. The pseudo-code provided below illustrates such an embodiment.
  if ((ctxIdx>=startIdx) && (ctxIdx<=endIdx))
  {
    if (bin==0) count0[statStartIdx+(ctxIdx−startIdx)]++;
    else if (bin==1) count1[statStartIdx+(ctxIdx−startIdx)]++;
  }
As with the other pseudocode discussed herein, this is one of many possible embodiments of calculating the desired values.

Further, in some embodiments, statistics may be gathered on a one-to-one basis or a collapsed basis with relation to a subset of contexts. For example, in some embodiments, statistics may be gathered on a one-to-one basis only with relation to contexts that correspond to luma processing. For example, selective context indices may be collapsed, when the contexts at the indices relate to luma processing.

For some syntax elements, a combination of statistics gathering techniques may be used. For example, in the below pseudo-code, the first 4 contexts are collapsed into a single set of statistics and the statistics for the final context is also collected in a separate set of statistics.
  if ((ctxIdx>=startIdx) && (ctxIdx<=(startIdx+3)))
  {
    if (bin==0) count0[statStartIdx]++;
    else if (bin==1) count1[statStartIdx]++;
  }
  else
  {
    if (bin==0) count0[statStartIdx+1]++;
    else if (bin==1) count1[statStartIdx+1]++;
  }
As with the other pseudocode discussed herein, this is one of many possible embodiments of calculating the desired values.

Determining Probabilities from Bit-Rate Statistics

Figure 8:
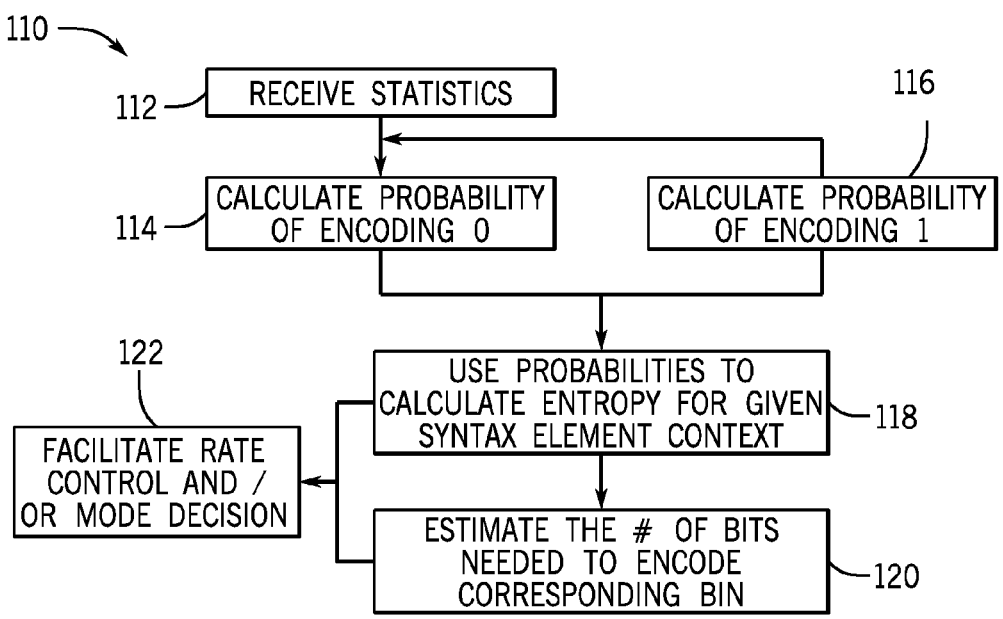
FIG. 8 illustrates a computer-implemented process for determining a probability of encoding 0 and a probability of encoding a 1, in accordance with an embodiment.

As mentioned above, the provided bit-rate statistics may be used to determine probabilities of encoding 0 and 1. FIG. 8 illustrates a computer-implemented process 110 for determining a probability of encoding 0 and a probability of encoding a 1. The process 110 begins by receiving the bit-rate statistics (block 112). As mentioned above, the bit-rate statistics include a count of encoded 0s and a count of encoded 1s. In some embodiments, these statistics may be provided to the MBI block 67 (of FIG. 6) via first-in-first-out hardware.

Next, probabilities of subsequent encoding of 0s and 1s are calculated (blocks 114 and 116, respectively). In one embodiment, the probability of encoding a 0 may be calculated by dividing the count of 0s by a sum of the count of 0s and count of 1s. Additionally, the probability of encoding a 1 may be calculated by dividing the count of 1s by a sum of the count of 0s and count of 1s. Alternatively, the probability of encoding a 1 may be calculated by subtracting the probability of encoding 0s from 1. The calculated probabilities may be used to calculate entropy for a given context (block 118) and/or estimate a number of bits needed to encode a corresponding bin (block 120). The outputs of blocks 118 and/or 120 may be used to facilitate decision making in other hardware blocks, such as the Motion Estimation block 52, Mode Decision block 58, Chroma Reconstruction block 60, and/or the Back-End Filter 64, each of which perform rate estimation and/or mode decision (block 122).

For example, as discussed above, the mode decision block 58 may determine a prediction technique for a coding unit by comparing rate-distortion cost associated with the candidate prediction mode configurations and/or a skip mode. The rate-distortion cost may be obtained using the estimated bit rate.

HEVC Rate Estimation

Turning now to a discussion of rate estimation, various blocks within the video encoding pipeline 34 perform rate estimation. For example, the Motion Estimation block 52, Mode Decision block 58, Chroma Reconstruction block 60, Back-End Filter 64 each perform rate estimation.

Encoding standards may require rate estimates for syntax elements. For example, in the HEVC standard, rate estimates are required for each syntax element that is needed when performing a rate/distortion decision that depends upon that syntax element. In some cases, several syntax elements are grouped together and an estimate is formed for the ensemble. In certain embodiments, these estimate have a default value, but may also be programmed by firmware to take into consideration the compressed CABAC rate that the syntax element will require.

For syntax elements related to motion information in CABAC, rate estimates may be determined for: Motion Vector Difference (MVD), Reference Index (ref_idx), Motion Vector Prediction (MVP) index (mvp_flag), an Inter-prediction code (InterPredIdc), a Merge Index (merge_idx), and a Merge Flag(merge_flag).

For example, the motion vector difference includes an x-component for the horizontal direction and a y-component for the vertical direction. In some embodiments, the rate estimate for the motion vector difference is calculated as follows for each of the motion vector difference components:

absMVD=abs(mvI[i]) i=0, 1
if (absMVD==0) rateMVD=rateMVDParam[0]
else if (absMVD==1) rateMVD=rateMVDParam[1]
else    rateMVD=rateMVDParam[2]+(31−clz(absMVD)) *2*64

In the above pseudo-code, the three parameters rateMVDParam[0], rateMVDParam[1] and rateMVDParam[2] are software programmable parameters and may be fixed point or floating point numbers. By default, the values of the parameters may be set as follows:
rateMVDParam[0]=64
rateMVDParam[1]=192
rateMVDParam[2]=192

As with the other pseudocode discussed herein, this is one of many possible embodiments of calculating the desired values.

The function clz( ) is a count of leading zeros, assuming a 32-bit input. The rate estimate for the motion vector difference, rateMVD, may be a fixed point or floating point number.

As mentioned above, rate estimation may be facilitated by the statistics provided in FIG. 7 and/or the probabilities calculated in FIG. 8. The rateMVDParam, in certain embodiments, may be calculated by using the zero and one probabilities for two syntax elements. For example, the rateMVDParam may be calculated according to:

$$P0gt0=\text{count}0gt0/(\text{count}0gt0+\text{count}1gt0)$$

$$P1gt0=1-P0gt0$$

$$P0gt1=\text{count}0gt1/(\text{count}0gt1+\text{count}1gt1)$$

$$P1gt1=1-P0gt1$$

$$\text{rateMVDParam}0=64*(-\log 2(P0gt0))$$

$$\text{rateMVDParam}1=64*(-\log 2(P1gt0)-\log 2(P0gt1))$$

$$\text{rateMVDParam}2=64*(-\log 2(P1gt0)-\log 2(P1gt1))$$

where gt0 and gt1 are greater than 0 and greater than 1 counts associated with certain syntax elements abs_MVD_gt0 and abs_MVD_gt1 of an encoding specification (e.g., H.265 specification). Further, P0gt and P1gt are the respective 0 and 1 probabilities for the counts associated with gt0 and gt1. As with the other pseudocode discussed herein, this is one of many possible embodiments of calculating the desired values.

In some embodiments, a reference index may provide an index into a reference picture list. In certain embodiments, for the reference index, there is a possibility of encoding up to two reference indices, one for each of two lists, where one list is references frames that precede the current frame and the second list refers to the references that follow the current frame. The rate estimate for each reference index is 0, unless the configuration parameter num_ref_idx_active_minus1 is larger than 0 for a given list, in which case a rate estimate is formed. The rate estimate for the reference index is as follows:
if (refIdx==0) rateRefIdx=rateRefParam[0];
else if (refIdx==1) rateRefIdx=rateRefParam[1];
else rateRefIdx=rateRefParam[2]+(min(refIdx+1, num_ref_idx_active_minus1)−2)*64;

As with the other pseudocode discussed herein, this is one of many possible embodiments of calculating the desired values.

In the above, rateRefParam[0], rateRefParam[1] and rateRefParam[2] may be software configurable fixed point or floating point parameters. The default setting for each parameter is as follows:
rateRefParam[0]=64
rateRefParam[1]=(num_ref_idx_active_minus1==1) ? 64:128
rateRefParam[2]=128

The rateRefParam may be estimated according to:

$$P0b0 = \text{count}0b0/(\text{count}0b0 + \text{count}1b0)$$

$$P1b0 = 1 - P0b0$$

$$P0b1 = \text{count}0b1/(\text{count}0b1 + \text{count}1b1)$$

$$P1b1 = 1 - P0b1$$

$$\text{rateRefParam}0 = 64 * (-\log 2(P0b0))$$

$$\text{rateRefParam}1 = 64 * (-\log 2(P1b0))$$

$$\text{rateRefParam}2 = 64 * (-\log 2(P1b0) - P0b1 * \log 2(P0b1) - P1b1 * \log 2(P1b1))$$

where b0 and b1 are counts associated with two contexts of the reference index syntax element. As with the other pseudocode discussed herein, this is one of many possible embodiments of calculating the desired values.

Further, the rate estimation for the Inter-prediction code may be determined as follows:
If ((nPbW+nPbH) !=12)
{
    if (InterPredIdc==0) rateInterPredIdc=rateIPCParam[0];
    else if (InterPredIdc==1) rateInterPredIdc=rateIPCParam[1];
    else rateInterPredIdc=rateIPCParam[2];
}
else
{
    if (InterPredIdc==0) rateInterPredIdc=rateIPCParam[3];
    else rateInterPredIdc=rateIPCParam[4];
}
nPbW is a variable specifying the width of the current luma prediction block. nPbH is a variable specifying the height of the current luma prediction block. As with the other pseudocode discussed herein, this is one of many possible embodiments of calculating the desired values.

The rateIPCParam may be calculated according to:

$$P0b0 = \text{count}0b0/(\text{count}0b0 + \text{count}1b0)$$

$$P1b0 = 1 - P0b0$$

$$P0b1 = \text{count}0b1/(\text{count}0b1 + \text{count}1b1)$$

$$P1b1 = 1 - P0b1$$

$$\text{rateIPCParam}0 = 64 * (-\log 2(P0b0) - \log 2(P0b1))$$

$$\text{rateIPCParam}1 = 64 * (-\log 2(P0b0) - \log 2(P1b1))$$

$$\text{rateIPCParam}2 = 64 * (-\log 2(P1b0))$$

$$\text{rateIPCParam}3 = 64 * (-\log 2(P0b1))$$

$$\text{rateIPCParam}4 = 64 * (-\log 2(P1b1))$$

where b0 and b1 are counts associated with the inter-prediction code. As with the other pseudocode discussed herein, this is one of many possible embodiments of calculating the desired values.

In some embodiments, motion information for predictive and current video blocks may be merged. The merge index may indicate whether to locate the merging video block in a reference picture list containing merging candidate blocks.

The Merge Index may be determined as follows:
if (MergeIdx==0) rateMergeIdx=rateMIParam[0];
else if (MergeIdx==1) rateMergeIdx=rateMIParam[1];
else rateMergeIdx=rateMIParam[2]+(min(MergeIdx+1, MaxNumMergeCand)−2)*64;

As with the other pseudocode discussed herein, this is one of many possible embodiments of calculating the desired values.

In the above rateMIParam[0], rateMIParam[1] and rateMIParam[2] are software-configurable fixed point or floating point parameters. The default setting for each parameter is as follows:
rateMIParam[0]=64
rateMIParam[1]=(MaxNumMergeCand==1) ? 64:128
rateMIParam[2]=128.

Further, in some embodiments estimation of the rate coefficient parameters may be calculated according to:

$$P0b0 = \text{count}0b0/(\text{count}0b0 + \text{count}1b0)$$

$$P1b0 = 1 - P0b0$$

$$\text{rateRefParam}0 = 64 * (-\log 2(P0b0))$$

$$\text{rateRefParam}1 = 64 * (-\log 2(P1b0))$$

$$\text{rateRefParam}2 = 64 * (-\log 2(P1b0)) + 1$$

where b0 is a count associated with the single context of the merge index. As with the other pseudocode discussed herein, this is one of many possible embodiments of calculating the desired values.

Certain rate estimates may be useful for encoding each transform unit. For example, rate estimations for: a Transform Skip Flag, Last Significant Coefficient, and certain coefficients may be useful. These rate estimations may be determined based at least in part upon the previously collected bit-rate statistics and/or probabilities.

Figure 9:
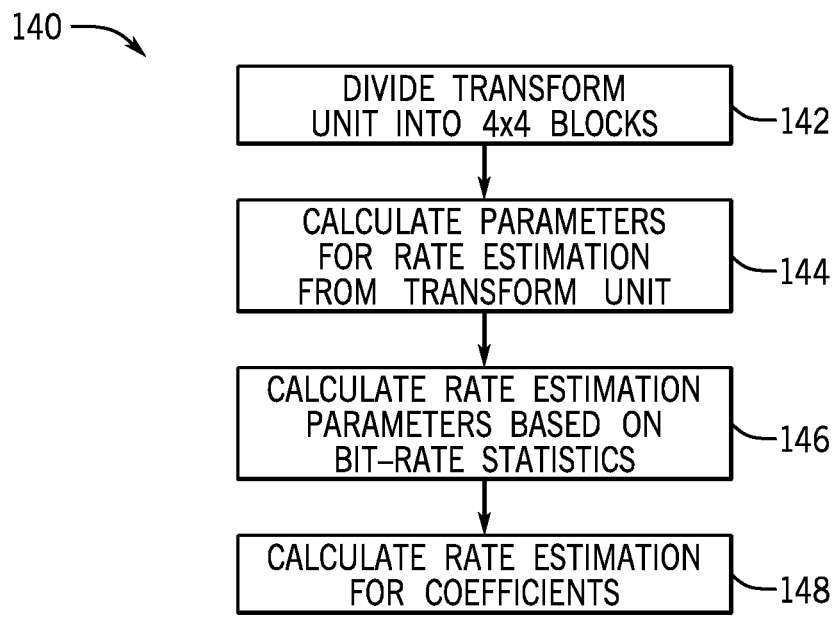
FIG. 9 illustrates a process for calculating coefficient rates, in accordance with an embodiment.
Figure 10:
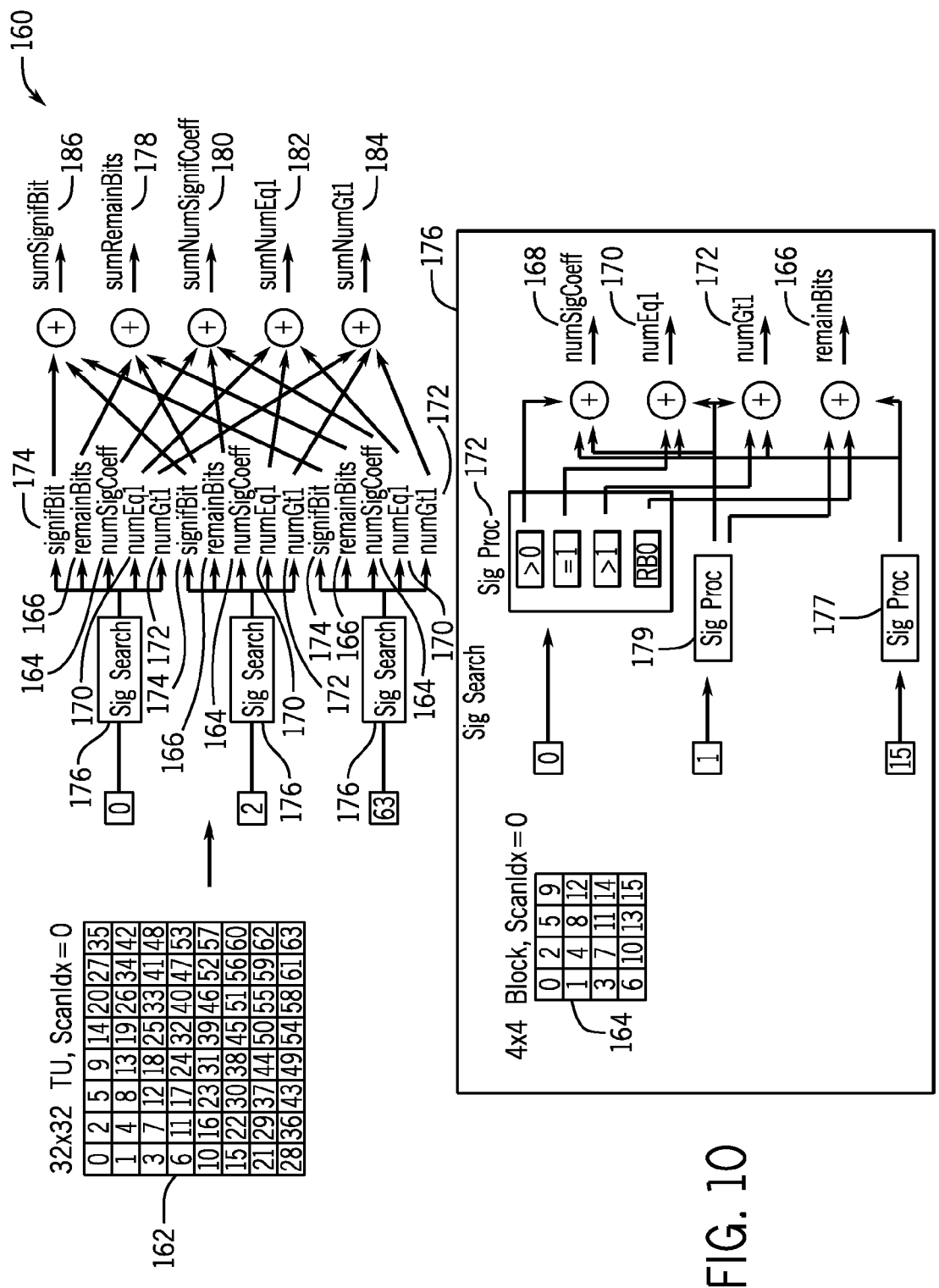
FIG. 10 is a block diagram illustrating the calculation of the above-mentioned parameters, in accordance with an embodiment.

FIG. 9 illustrates a process 140 for calculating coefficient rates. FIG. 10 is a block diagram 160 illustrating the calculation of the above-mentioned parameters.

To calculate these rates, in certain embodiments, the transform unit 162 is divided into 4×4 blocks 164 (block 142). For each divided transform unit, a set of parameters useful for determining the rate estimation may be calculated (block 144). In certain embodiments, the following parameters are calculated:
remainBits 166: the number of bits needed for coefficients larger than 1.
numSigCoeff 168: the number of coefficients that are larger than 0.
numEq1 170: the number of coefficients that are equal to 1.
numGt1 172: the number of coefficients that are greater than 1.
signifBit 174: set to 1 if numSigCoeff is non-zero.
lastSigBlock: the last significant block.
lastSigPos: the last significant position in last significant block.

The first 4 parameters 166, 168, 170, and 172 listed above may be calculated (e.g., using significant coefficient ("sig") search logic 176) by traversing the transform unit block and performing comparisons (e.g., by processor(s) 177) on each coefficient to determine if it is larger than 0, larger than 1, and if it is larger than 1 then the number of bits needed for the coefficient. The values that are calculated for each coefficient may then be added together for the 4×4 block to form: sumRemainBits 178, sumNumSignifCoeff 180, sumNumEq1 182, and sumNumGt1 184, respectively. The values that are calculated for each block may be added together to form the final value.

The signifBit 174 bit may be calculated by comparing numSigCoeff to 0. If it is larger than 0, then this bit will be set and it represents whether a given block contains any significant coefficients. The summation of the sinifBits 174 may result in the sumSignifBit 186. The parameter lastSig-Block may be calculated by comparing the parameter numSigCoeff to the value 0. If it is larger than 0, then a bit position that is determined by the ScanIdx parameter, which may indicate horizontal, vertical, and/or diagonal scans, will be marked as 1.

Next, rate estimation parameters based upon the bit-rate statistics may be calculated (block 146).

For example, a rate estimation for the coefficients may be based in part upon one or more rate parameters (e.g., rateCsbfParam and/rateCoeffParam) calculated from the statistics of FIG. 7 and/or probabilities discussed in FIG. 8. In some embodiments, the rateCsbfParam may be calculated according to:

$$P0 = count0/(count0+count1)$$

$$P1 = 1-P0$$

$$rateCsbfParam = 64*(-p0 \log 2(p0) - p1 \log 2(p1))$$

where count0 and count1 are the 0 and 1 counts for a single set of count statistics associated with a coded sub block flag output from the SEB block 66. As with the other pseudocode discussed herein, this is one of many possible embodiments of calculating the desired values.

Further, the rateCoeffParam may be calculated according to:

$$P0gt = count0gt/(count0gt+count1gt)$$

$$P1gt = 1-P0gt$$

$$P0s = count0s/(count0s+count1s)$$

$$P1s = 1-P0s$$

$$rateCoeffParam0 = 64*(-\log 2(P0s))$$

$$rateCoeffParam1 = 64*(-\log 2(P1s) - \log 2(P0gt))$$

$$rateCoeffParam2 = 64*(-\log 2(P1s) - \log 2(P1gt))$$

where gt and s are counts associated with one of two syntax elements, respectively (e.g., coeff_abs_level_greater1_flag and sig_coeff_flag). The coeff_abs_level_greater1_flag and sig_coeff_flag syntax elements may be specified in the encoding specification (e.g., the H.265 specification). Further, P0gt and P1gt are the respective 0 and 1 probabilities for the counts associated with the gt. P0s and P1s are the respective 0 and 1 probabilities for the counts associated with s. As with the other pseudocode discussed herein, this is one of many possible embodiments of calculating the desired values.

From there, the rate estimate for the coefficients (rateCoeff) may be calculated, in one embodiment, (block 148) according to:

$$actSigBlocks = sumSignifBit$$

$$numSigCoeffFlags = (actSigBlocks-1)*16 + lastSigPos$$

$$numSigCoeff1Flags = sumNumSigCoeff;$$

$$numSigCoeff0Flags = numSigCoeffFlags + 1 - numSigCoeff1Flags;$$

$$rateCoeff = max((lastSigBlock-1),0)*rateCsbfParam + (numSigCoeff0Flags)*rateCoeffParam[0] + (sumNumEq1)*rateCoeffParam[1] + (sumNumGt1)*rateCoeffParam[2] + sumRemainBits*64;$$

As with the other pseudocode discussed herein, this is one of many possible embodiments of calculating the desired values.

Turning now to a discussion of rate estimation for the last significant coefficient, the last significant coefficient will have an x-coordinate and a y-coordinate, both of which need to be coded. The rate estimate for the x-coordinate is the same as the rate estimate for the y-coordinate. The rate estimate for each coordinate may be broken down into two components: a prefix and a suffix.

The rate estimate for the prefix (i.e., lastSigCoeffXPrefix or lastSigCoeffYPrefix), denoted as lastSigPrefix, is calculated as follows:

if (lastSigPrefix<cMax)

$$rate = (lastSigPrefix+1)*ratePrefixParamX(Y)[\log 2TrafoSize][0]$$

else $$rate = cMax*ratePrefixParamX(Y)[\log 2TrafoSize][1]$$

The parameter ratePrefixParamX(Y) is programmable and is an array of dimension 4×2, where the first dimension indexes the transform size (i.e., 4×4, 8×8, 16×16 or 32×32) and the last dimension indexes whether the prefix is less than cMax or equal to cMax. In some embodiments, the value of cMax, may be a fixed point or floating point number and the value of ratePrefixParamX(Y) may be a fixed point or floating point number, with a default value of 64.

The statistics that are needed to estimate ratePrefixParam are the fourteen counts (bi, i=0, 1, . . . 13) associated with the syntax element last_sig_prefix. There are fourteen counts for each of the x and y components. There are separate rate estimates for the x and y components, but the method of estimation is the same. A suggestion for estimating the rate coefficient parameters is given below. The probabilities for each bi is calculated as follows. The rate coefficient parameter ratePrefixParamX(Y)[j][i] may be estimated according to:

$$P0bi = count0bi/(count0bi+count1bi)$$

$$P1bi = 1-P0bi$$

Rate estimates are formed for each transform size (i.e., log 2TrafoSize=2, 3, 4, 5). The counts that are associated with each transform size are as follows:

log 2TrafoSize=2: counts b0, b1, b2
log 2TrafoSize=3: counts b3, b4, b5
log 2TrafoSize=4: counts b6, b7, b8, b9
log 2TrafoSize=5: counts b10, b11, b12, b13

The rate estimate for each transform size is formed by enumerating each possible codeword for the given transform size and then calculating the average entropy over the codewords for the case where the codeword is less than cMax and for the case where the codeword is equal to cMax.

Turning now to a discussion of rate estimation for partition modes. Rate estimation may also occur for intra and inter partition modes. In intra mode, there are partition types N×N and 2N×2N. The rate estimates for N×N may be determined using a first rate part mode parameter (e.g. RatePartModeParam[0]) and the rate estimates for 2N×2N may be determined using a second rate part mode parameter (e.g. RatePartModeParam[1]).

For inter mode, several partition types may be supported (e.g., N×N, 2N×2N, N×2N, and 2N×N. The rate estimates for N×N may be determined using a first rate part mode parameter (e.g. RatePartModeParam[4]), the rate estimates for N×2N may be determined using a second rate part mode parameter (e.g. RatePartModeParam[3]), rate estimates for 2N×N may be determined using a third rate part mode parameter (e.g. RatePartModeParam[2]), and the rate estimates for 2N×2N may be determined using a fourth rate part mode parameter (e.g. RatePartModeParam[1]).

The rate part mode parameters for intra and inter partition modes may be estimated according to:

$$P0b0 = \text{count}0b0/(\text{count}0b0 + \text{count}1b0)$$

$$P1b0 = 1 - P0b0$$

$$P0b1 = \text{count}0b1/(\text{count}0b1 + \text{count}1b1)$$

$$P1b1 = 1 - P0b1$$

$$P0b2 = \text{count}0b2/(\text{count}0b2 + \text{count}1b2)$$

$$P1b2 = 1 - P0b2$$

$$\text{ratePartModeParam0} = 64*(-\log 2(P0b0))$$

$$\text{ratePartModeParam1} = 64*(-\log 2(P1b0))$$

$$\text{ratePartModeParam2} = 64*(-\log 2(P0b0) - \log 2(P1b1) - P1b2*\log 2(P1b2))$$

$$\text{ratePartModeParam3} = 64*(-\log 2(P0b0) - \log 2(P0b1) - P1b2*\log 2(P1b2))$$

$$\text{ratePartModeParam4} = 64*(-\log 2(P0b0) - \log 2(P0b1) - \log 2(P0b2))$$

Where b0, b1, and b2 are counts associated with a part mode syntax element.

Having discussed the rate estimation and mode decision using the bit-rate statistics, the discussion now returns to FIG. 6. In FIG. 6, the transcode pipeline 50 may then convert the bin stream to a bit stream with one or more syntax elements represented by a fractional number of bits. In some embodiments, the transcode pipeline 50 may compress bins from the bin stream into bits using arithmetic coding. To facilitate arithmetic coding, the transcode pipeline 50 may determine a context model for a bin, which indicates probability of the bin being a "1" or "0," based on previous bins. Based on the probability of the bin, the transcode pipeline 50 may divide a range into two sub-ranges. The transcode pipeline 50 may then determine an encoded bit such that it falls within one of two sub-ranges to select the actual value of the bin. In this manner, multiple bins may be represented by a single bit, thereby improving encoding efficiency (e.g., reduction in size of source image data). After entropy encoding, the transcode pipeline 50, may transmit the encoded image data to the output 38 for transmission, storage, and/or display.

As described above, the duration provided for encoding image data may be limited, particularly to enable real-time or near real-time display and/or transmission. To improve operational efficiency (e.g., operating duration and/or power consumption) of the main pipeline 48, the low resolution pipeline 46 may include a low resolution motion estimation (ME) block 68. As will be described in more detail below, the low resolution motion estimation block 68 may improve operational efficiency by initializing the motion estimation block 52 with candidate inter-frame prediction modes, which may facilitate reducing search performed by the motion estimation block 52. Additionally, the low resolution motion estimation block 68 may improve operational efficiency by indicating where scene changes are expected to occur to the mode decision block 58 and/or the motion estimation block 52, which may enable only considering candidate intra-frame prediction modes and a skip mode and, thus, disabling the motion estimation block 52.

Accordingly, the technical effects of the present disclosure include improving operational efficiency of a video encoding pipeline used to encode (e.g., compress) source image data. In some embodiments, the video encoding pipeline may include a low resolution pipeline in parallel with a main pipeline. In this manner, the low resolution pipeline may determine information, such as low resolution inter-frame prediction modes and/or statistics, that may be used in the main pipeline to improve operational efficiency. For example, low resolution inter-frame prediction modes may provide an indication of where reference samples are expected to be located, which may reduce motion estimation searching performed by the main pipeline. Additionally, the statistics may enable the main pipeline to determine where a scene change is expected to occur and adjust operation accordingly. For example, bit-rate estimation used in the encoding process may be simplified using the bit-rate statistics generated in the main pipeline. Further, mode decisions may decide between various operational modes based upon these statistics.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A video encoding pipeline configured to encode image data, comprising:
   a main pipeline configured to receive image data and to determine encoding operational parameters used to encode the image data, wherein the main pipeline comprises:
   syntax element binarization circuitry configured to binarize syntax elements, the syntax element binarization circuitry comprising a first hardware block configured to:
      generate at least one set of bit-rate statistics, the set of bit-rate statistics comprising:
         a count of zeros encoded for a particular context or set of contexts of a syntax element of the image data; and
         a count of ones encoded for the particular context or set of contexts of the syntax element of the image data; and
      provide the at least one set of bit-rate statistics to at least one other hardware block of the video encoding pipeline;
   a second hardware block configured to:
      receive the at least one set of bit-rate statistics;
      based upon the count of ones and count of zeros, determine a probability of subsequently encoding zeros and a probability of subsequently encoding ones; and control at least one subsequent bit-rate of the video encoding pipeline, determine at least one operational mode of the video encoding pipeline, or both, based at least in part upon the probability of subsequently encoding zeros, the probability of subsequently encoding ones, or both;

inter-frame prediction circuitry configured to determine a first luma prediction sample based at least in part on a candidate inter-frame prediction mode;

intra-frame prediction circuitry configured to determine a candidate intra-frame prediction mode and to determine a second luma prediction sample based at least in part on a candidate intra-frame prediction mode;

chroma reconstruction circuitry configured to determine chroma components of reconstructed image data based at least in part on a prediction mode determined by mode decision circuitry;

luma reconstruction circuitry configured to determine a luma component of the reconstructed image data based at least in part on the prediction mode determined by the mode decision circuitry; and back-end-filter circuitry configured to filter the reconstructed image data.

2. The video encoding pipeline of claim 1, comprising mode decision circuitry configured to:
   determine a rate-distortion cost based at least in part on the count of ones and count of zeros, the probability of subsequently encoding zeros and the probability of subsequently encoding ones, or both; and
   determine the at least one operational mode based at least in part upon the rate-distortion cost.

3. The video encoding pipeline of claim 1, wherein the main pipeline comprises:
   macroblock input circuitry comprising the second hardware block.

4. The video encoding pipeline of claim 1, wherein a rate estimate for a motion vector difference is calculated using the at least one set of statistics.

5. The video encoding pipeline of claim 4, wherein the rate estimation for the motion vector difference comprises an x-component estimate for a horizontal direction and a y-component estimate for a vertical direction.

6. The video encoding pipeline of claim 1, wherein a rate estimate for a motion vector prediction index, an inter-prediction code, a merge index, a merge flag, or combination thereof is calculated using the at least one set of statistics.

7. The video encoding pipeline of claim 1, wherein a rate estimate for a transform skip flag, a last significant coefficient, or certain transform unit encoding coefficients is calculated using the at least one set of statistics.

8. The video encoding pipeline of claim 1, wherein a rate estimate for an intra-partition mode, an inter-partition mode, or both is calculated using the at least one set of statistics.

9. The video encoding pipeline of claim 1, wherein the second hardware block comprises a motion estimation block, a back end filter block, or both, the motion estimation block, the backend filter block, or both configured to perform rate-distortion optimization using the counts of ones and count of zeros, the probability of subsequently encoding zeros and the probability of subsequently encoding ones, or both.

10. A video encoding pipeline configured to encode image data, comprising:
   a main pipeline configured to receive image data and to determine encoding operational parameters used to encode the image data, wherein the main pipeline comprises:
      a first hardware block configured to:
         generate at least one set of bit-rate statistics, the set of bit-rate statistics comprising:
            a count of zeros encoded for a particular context or set of contexts of a syntax element of the image data; and
            a count of ones encoded for the particular context or set of contexts of the syntax element of the image data; and
         provide the at least one set of bit-rate statistics to at least one other hardware block of the video encoding pipeline; and
      a second hardware block configured to:
         receive the at least one set of bit-rate statistics;
         based upon the count of ones and count of zeros, determine a probability of subsequently encoding zeros and a probability of subsequently encoding ones; and
         control at least one subsequent bit-rate of the video encoding pipeline, determine at least one operational mode of the video encoding pipeline, or both, based at least in part upon the probability of subsequently encoding zeros, the probability of subsequently encoding ones, or both;
   wherein a low resolution inter-frame prediction mode comprises a motion vector and a reference index configured to indicate where a reference sample in full resolution is expected to occur, wherein a rate estimate for the reference index is calculated using the at least one set of statistics; and
   wherein the rate estimate for the reference index is calculated according to:
      if the reference index is 0, a rate reference index is set equal to a first rate reference parameter at a first parameter index;
      if the reference index is 1, the rate reference index is set equal to a second rate reference parameter at a second parameter index;
      otherwise, the rate reference index is set equal to a third rate reference parameter at a third parameter index added to a (minimum value−2) multiplied by 64, the minimum value being a minimum of:
         the reference index+1; and
         a number of active reference indices −1.

11. A tangible, non-transitory, computer-readable medium configured to store instructions executable by a processor in a video encoding pipeline, wherein the instructions comprise instructions to:
   generate, using the processor, at least one set of bit-rate statistics, the set of bit-rate statistics comprising:
      a count of zeros encoded for a particular context or set of contexts of a syntax element of the image data; and
      a count of ones encoded for the particular context or set of contexts of the syntax element of the image data;
   control, using the processor, at least one subsequent bit-rate of the video encoding pipeline in a subsequent encoding; or determine, using the processor, at least one operational mode of the video encoding pipeline in the subsequent encoding, or both, based upon a bit-rate estimate for the subsequent encoding, the bit-rate estimate estimated based upon a probability of subsequently encoding of zeros and ones determined based at least in part upon the counts of ones and count of zeros;
   determine a first luma prediction sample based at least in part on a candidate inter-frame prediction mode;
   determine a candidate intra-frame prediction mode;

determine a second luma prediction sample based at least in part on a candidate intra-frame prediction mode;

determine chroma components of reconstructed image data based at least in part on a prediction mode;

determine a luma component of the reconstructed image data based at least in part on the prediction mode; and filter the reconstructed image data.

12. The computer-readable medium of claim 11, comprising instructions to calculate a rate estimate, based upon the set of bit-rate statistics, for each syntax element used in performing a rate distortion decision.

13. The computer-readable medium of claim 11, comprising instructions to determine a rate estimate for at least one syntax element related to motion information.

14. The computer-readable medium of claim 11, comprising instructions to determine a rate estimate for at least one syntax element related to encoding transform units.

15. A computing device comprising:
an image data source configured to generate first image data corresponding with a first image frame;
a video encoding pipeline configured to generate first encoded image data by encoding the first image data, wherein the video encoding pipeline comprises:
syntax element binarization (SEB) circuitry configured to output a bin stream having header and residual syntax elements for each basic processing unit of the video encoding pipeline, wherein the SEB circuitry is configured to generate at least one set of bit-rate statistics, the set of bit-rate statistics comprising:
  a count of zeros encoded for a particular context or set of contexts of at least one syntax element of the residual syntax elements; and
  a count of ones encoded for the particular context or set of contexts of the at least one syntax element;
circuitry configured to control at least one bit rate based upon a bit-rate estimation for subsequently encoding zeros, ones, or zeros and ones, calculated based at least in part upon the set of bit-rate statistics, mode decision circuitry configured to determine encoding operational parameters used to encode the first image data based at least in part on the bit-rate estimation, or both; and
an output configured to receive the first encoded image data and to display the first image frame or to transmit the first image frame in real-time or near real-time when generated;
wherein a low resolution inter-frame prediction mode of the circuitry comprises a motion vector and a reference index configured to indicate where a reference sample in full resolution is expected to occur, wherein a rate estimate for the reference index is calculated using the set of bit-rate statistics; and
wherein the rate estimate for the reference index is calculated according to:
  if the reference index is 0, a rate reference index is set equal to a first rate reference parameter at a first parameter index;
  if the reference index is 1, the rate reference index is set equal to a second rate reference parameter at a second parameter index;
  otherwise, the rate reference index is set equal to a third rate reference parameter at a third parameter index added to a (minimum value−2) multiplied by 64, the minimum value being a minimum of:
    the reference index+1; and
    a number of active reference indices −1.

16. The computing device of claim 15, wherein the set of bit-rate statistics are collected on a one-to-one basis with relation to all contexts of the residual syntax elements.

17. The computing device of claim 15, wherein the set of bit-rate statistics are collected on a one-to-one basis with relation to a sub-set of contexts of the residual syntax elements.

* * * * *